United States Patent Office 2,816,907
Patented Dec. 17, 1957

2,816,907

1,4a - DIMETHYL - 6 - HYDROXY - 7 - ISOPROPYL - 1,2,3,4,4a,9,10,10a - OCTAHYDROPHENANTHRENE - 1 - CARBONITRILE AND DERIVATIVES THEREOF

Willard M. Hoehn, Wilmette, Ill., assignor to G. D. Searle & Co., Chicago, Ill., a corporation of Delaware No Drawing. Application April 9, 1956
Serial No. 576,781

7 Claims. (Cl. 260—464)

The present invention deals with phenanthrene carbonitriles, and is specifically concerned with 1,4a-dimethyl-6 - hydroxy - 7 - isopropyl - 1,2,3,4,4a,9,10,10a-octahydrophenanthrene-1-carbonitrile, with ethers and esters thereof, and with methods for their manufacture. The compounds of this invention can be represented by the structural formula

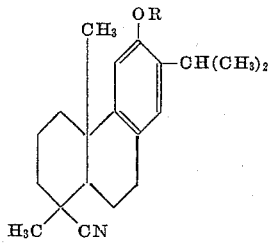

wherein R can be hydrogen, a lower alkyl radical, or a lower alkanoyl radical.

The term R in the foregoing structural formula can represent such lower alkyl radicals as methyl, ethyl, propyl, butyl, amyl, hexyl, heptyl, octyl, and branched-chain isomers thereof. It can also represent such lower alkanoyl radicals as formyl, acetyl, propionyl, butyryl, valeryl, hexanoyl, heptanoyl, octanoyl, and their branched-chain isomers, the foregoing alkanoyl radicals being the acyl radicals of alkanoic acids having fewer than 9 carbon atoms.

A satisfactory starting material for the manufacture of the compounds of this invention is the dehydrogenated rosin nitrile prepared by reacting dehydrogenated rosin with ammonia at an elevated temperature and removing the water from the reaction mixture as it is formed, for example according to the processes disclosed in U. S. 2,534,297 to Putnam. The product obtained from dehydrogenated rosin by the methods of the aforementioned patent is crude dehydroabietonitrile, which can be crystallized to give purified dehydroabietonitrile, or 1,4a-dimethyl - 7 - isopropyl - 1,2,3,4,4a,9,10,10a-octahydrophenanthrene-1-carbonitrile, as disclosed therein.

1,4a - dimethyl - 7-isopropyl-1,2,3,4,4a,9,10,10a-octahydrophenanthrene - 1 - carbonitrile (dehydroabietonitrile) undergoes Friedel-Crafts reactions with acyl halides to yield 6-acyl substitution products. For example, the aluminum chloride-catalyzed reaction of 1,4a-dimethyl-7-isopropyl - 1,2,3,4,4a,9,10,10a - octahydrophenanthrene-1-carbonitrile with acetyl chloride affords 1,4a-dimethyl-6-acetyl - 7 - isopropyl-1,2,3,4,4a,9,10,10a-octahydrophenanthrene-1-carbonitrile. By reaction of this compound, suitably in a hydrocarbon or a chlorinated hydrocarbon solvent, with a peroxy acid such as performic acid, peracetic acid, perbenzoic acid, perphthalic acid, or peroxytrifluoroacetic acid, there occurs oxidative rupture of a carbon-carbon bond and the formation of 1,4a-dimethyl-6-acetoxy - 7 - isopropyl - 1,2,3,4,4a,9,10,10a-octahydrophenanthrene-1-carbonitrile. This compound can be isolated directly from the reaction mixture. However, a method of operation which is slightly more satisfactory involves subjecting the crude reaction product to a basic hydrolysis, whereby the acetoxy group is hydrolyzed. Acidification then generates the free phenol, 1,4a-dimethyl-6-hydroxy - 7 - isopropyl-1,2,3,4,4a,9,10,10a-octahydrophenanthrene-1-carbonitrile, which is readily separated and purified. Other 6-acyl substitution products of dehydroabietonitrile are also suitable for use in the processes of this invention. For example, the aluminum chloride-catalyzed reaction of dehydroabietonitrile with butyryl chloride yields 1,4a-dimethyl-6-butyryl-7-isopropyl-1,2,3,4,4a-9,10,10a-octahydrophenanthrene-1-carbonitrile. This latter compound, upon treatment with a peroxy acid followed by hydrolysis of the primary reaction product, yields the same 1,4a-dimethyl-6-hydroxy-7-isopropyl-1,2,3,4,4a,9,10,10a - octahydrophenanthrene-1-carbonitrile that is obtained from the corresponding 6-acetyl derivative.

Lower alkanoic acid esters of this invention can be prepared, alternatively, by subjecting a 6-alkanoyl substitution product of dehydroabietonitrile to oxidation with a peroxy acid and isolating the reaction product without an intervening hydrolytic operation, or by subjecting 1,4a-dimethyl - 6 - hydroxy - 7 - isopropyl - 1,2,3,4,4a,9,10,10a-octahydrophenanthrene-1-carbonitrile to reaction with an acylating agent such as a lower alkanoic acid anhydride or a lower alkanoyl halide, suitably in pyridine as a solvent. Lower alkyl ethers of this invention can be prepared by treatment of 1,4a-dimethyl-6-hydroxy-7-isopropyl-1,2,3,4,4a,9,10,10a-octahydrophenanthrene - 1 - carbonitrile with a basic reagent and an alkylating agent such as a dialkyl sulfate or an alkyl halide. Becuse of the relative unreactivity of the sterically-hindered nitrile group in these compounds, such reactions can be conducted in basic media without effecting substantial hydrolysis of the nitrile group.

The compounds of the present invention have valuable pharmacological properties. They exhibit hormonal effects and, specifically, are androgenic and anabolic agents. In addition, they exhibit certain of the biological characteristics which are associated with estrogenic hormones, while at the same time they show little or no estrogenic activity. Thus, the administration of the compounds of this invention causes a reduction in the serum ratio of cholesterol to phospholipids, and therefore results in an inhibitory effect on the arterial deposition of cholesterol. Because these compounds achieve this result, which is commonly associated with estrogen therapy, without producing a corresponding feminization, they are useful in the treatment of hypercholesterolemia and disorders associated therewith.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.), pressures in millimeters (mm.) of mercury and quantities of materials in parts by weight.

Example 1

With efficient stirring, 95 parts of aluminum chloride is added to a solution of 100 parts of 1,4a-dimethyl-7-isopropyl - 1,2,3,4,4a-9,10,10a-octahydrophenanthrene-1-carbonitrile and 31 parts of acetyl chloride in 425 parts of nitrobenzene maintained at about −5 to +8° C. The reaction mixture is stirred for an additional 3 hours and kept under refrigeration for 2–3 days. The mixture is then poured on about 500 parts of ice, and sufficient ether is added to cause the density of the organic phase to become less than the density of the aqueous phase. The organic phase is separated and washed with a total of 600 parts of water in two portions, a total of 600 parts of 2% sodium hydroxide solution in two portions and then with several portions of water. The ethereal solution is dried over sodium sulfate, filtered, and concentrated on a steam bath and finally by a vacuum distillation at about 90–100° C. and a pressure of 15 mm. in order to remove the ether and nitrobenzene. A solution of the residue in chloroform is treated with activated charcoal, filtered and diluted with methanol. The precipitated product, 1,4a-dimethyl-6-acetyl-7-isopropyl-1,2,3,4,4a,9,10,10a - octahydrophenanthrene - 1-carbonitrile is collected on a filter. An additional quantity of this product is obtained by concentration of the mother liquor. This compound melts at 156–158° C. and has the following structural formula

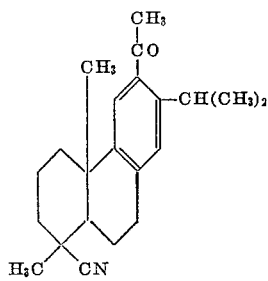

Example 2

To a solution of 10 parts of 1,4a-dimethyl-6-acetyl-7-isopropyl - 1,2,3,4,4a-9,10,10a-octahydrophenanthrene-1-carbonitrile in 90 parts of benzene maintained at 5–10° C. there is added a 0.3 molar solution of perbenzoic acid in benzene containing a total of 8.4 parts of perbenzoic acid. After 1 hour, the reaction mixture is allowed to warm to about 25° C., and it is maintained at this temperature in the dark for an additional 3 weeks. It is then washed successively and rapidly with 400 parts of water, with 600 parts of 3% sodium thiosulfate solution in 2 portions, with 400 parts of 2% sodium hydroxide solution in 2 portions and finally with several portions of water. The organic phase is concentrated to dryness and the oily residue is heated under reflux for 2 minutes with 40 parts of methanol and 10 parts of potassium hydroxide. Water (100 parts) is then added, and a small amount of insoluble material is removed by filtration. The filtrate is acidified and cooled, and the precipitated product is collected on a filter. For purification 9 parts of this crude, dried product is dissolved in a mixture of 100 parts of chloroform and 25 parts of ether; the resulting solution is concentrated to about one-third of its original volume and then diluted with about 20 parts of petroleum ether. When separation of the crystalline product is complete, it is collected on a filter and washed with petroleum ether. This compound is 1,4a - dimethyl-6-hydroxy-7-isopropyl-1,2,3,4,4a,9,10,10a-octahydrophenanthrene-1-carbonitrile melting at about 202–203° C. It shows an ultraviolet absorption maximum at about 282 millimicrons with a molecular extinction coefficient of about 3550. This compound has the structural formula

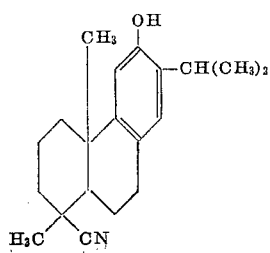

Example 3

A solution is prepared from 6 parts of 1,4a-dimethyl-6-hydroxy - 7-isopropyl-1,2,3,4,4a,9,10,10a - octahydrophenanthrene-1-carbonitrile, 35 parts of methanol, 15 parts of water, and 2.6 parts of sodium hydroxide. To this solution, stirred and maintained at about 60° C. there is added in several portions a total of 8.5 parts of dimethyl sulfate. Upon dilution with 150 parts of water and cooling, an insoluble gummy product separates from solution. This is washed by decantation with water and then dissolved in ether. The ethereal solution is washed with water, with 2% sodium hydroxide solution, and finally with several portions of water. The residual product obtained by concentration of the ethereal solution is purified by distillation. At a pressure of 0.05 mm. there is obtained a distillate, boiling point about 168–170° C., of 1,4a - dimethyl-6-methoxy-7-isopropyl-1,2,3,4,4a,9,10,10a-octahydrophenanthrene-1-carbonitrile. This compound has an ultraviolet absorption maximum at about 281 millimicrons with a molecular extinction coefficient of 3600. The structural formula is

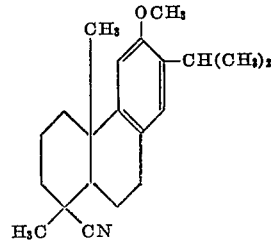

By the substitution of 10.5 parts of diethyl sulfate for the dimethyl sulfate in the foregoing procedure, there is obtained 1,4a-dimethyl-6-ethoxy-7-isopropyl-1,2,3,4,4a,9,10,10a-octahydrophenanthrene-1-carbonitrile.

Example 4

A solution of 3 parts of 1,4a-dimethyl-6-hydroxy-7-isopropyl - 1,2,3,4,4a,9,10,10a - octahydrophenanthrene - 1-carbonitrile, 80 parts of anhydrous propyl alcohol, 1.85 parts of propyl iodide and 0.9 part of sodium propoxide is heated under reflux for 1 hour. There is then added an additional 0.68 part of propyl iodide and 0.33 part of sodium propoxide, and the mixture is refluxed for 1 more hour. The mixture is then concentrated by distillation to about one-half its original volume and poured, with stirring, into 300 parts of water. The insoluble precipitate of 1,4a - dimethyl - 6 - propoxy - 7 - isopropyl - 1,2,3,4,4a,9,10,10a-octahydrophenanthrene-1-carbonitrile is collected and washed. This compound shows an ultraviolet absorption maximum at about 281 millimicrons. It has the structural formula

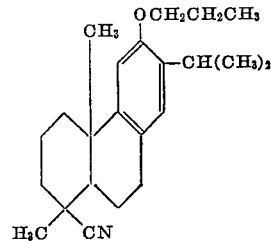

Example 5

A solution of 10 parts of 1,4a-dimethyl-6-hydroxy-7-isopropyl - 1,2,3,4,4a,9,10,10a - octahydrophenanthrene - 1-carbonitrile in 20 parts of pyridine and 40 parts of acetic anhydride is heated at about 90° C. for 1 hour. The cooled reaction mixture is slowly diluted with 400 parts of water. The mixture is chilled and, when separation of the solid product is complete, it is collected on a filter and washed with water. By recrystallization from aqueous methanol there is obtained purified 1,4a-dimethyl-6-acetoxy - 7 - isopropyl - 1,2,3,4,4a,9,10,10a - octahydrophenanthrene-1-carbonitrile melting at about 135–136° C. This compound shows ultraviolet absorption maxima at about 268 and 276 millimicrons with respective molecular extinction coefficients of about 1210 and 1280. The structural formula is

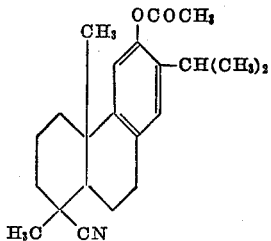

*Example 6*

A solution of 5 parts of 1,4a-dimethyl-6-hydroxy-7-isopropyl - 1,2,3,4,4a,9,10,10a - octahydrophenanthrene - 1-carbonitrile, 25 parts of pyridine and 10 parts of butyric anhydride is heated at about 90–100° C. for 6 hours. The cooled mixture is diluted with several times its volume of water, and the precipitated product is collected and washed. This compound is 1,4a-dimethyl-6-butyroxy-7-isopropyl - 1,2,3,4,4a,9,10,10a - octahydrophenanthrene-1-carbonitrile which shows ultraviolet absorption maxima at about 268 and 276 millimicrons and has a structural formula

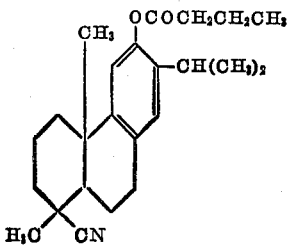

What is claimed is:
1. A compound of the structural formula

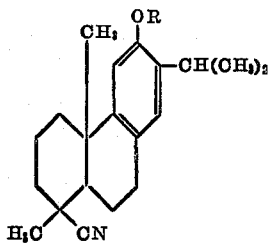

wherein R is a member of the group consisting of hydrogen, lower alkyl radicals, and lower alkanoyl radicals.

2. A compound of the structural formula

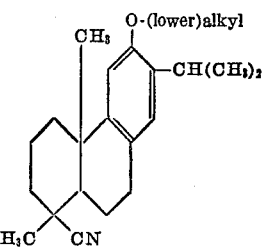

3. 1,4a - dimethyl - 6 - methoxy - 7 - isopropyl - 1,2,3,4,4a,9,10,10a-octahydrophenanthrene-1-carbonitrile.
4. A compound of the structural formula

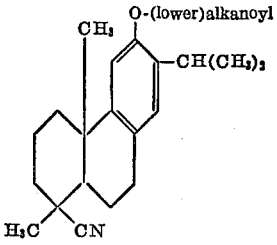

5. 1,4a - dimethyl - 6 - acetoxy - 7 - isopropyl - 1,2,3,4,4a,9,10,10a-octahydrophenanthrene-1-carbonitrile.
6. 1,4a - dimethyl - 6 - hydroxy - 7 - isopropyl - 1,2,3,4,4a,9,10,10a-octahydrophenanthrene-1-carbonitrile.
7. In a process for the manufacture of a compound of the structural formula

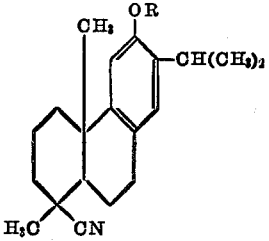

wherein R is a member of the group consisting of hydrogen, lower alkyl radicals, and lower alkanoyl radicals, the steps which comprise treating a solution of 1,4a-dimethyl-6 - acetyl - 7 - isopropyl - 1,2,3,4,4a,9,10,10a - octahydrophenanthrene-1-carbonitrile with a peroxy acid, subjecting the oxidation product to basic hydrolysis and subsequent acidification, and isolating 1,4a-dimethyl-6-hydroxy-7 - isopropyl-1,2,3,4,4a,9,10,10a-octahydrophenanthrene-1-carbonitrile.

References Cited in the file of this patent
UNITED STATES PATENTS
2,750,402   Sanderson _____ June 12, 1956
OTHER REFERENCES
Campbell et al.: Jour. Am. Chem. Soc., vol. 64, pp. 928–35 (1942).